United States Patent
Challenger et al.

(10) Patent No.: US 6,574,715 B2
(45) Date of Patent: Jun. 3, 2003

(54) METHOD AND APPARATUS FOR MANAGING INTERNAL CACHES AND EXTERNAL CACHES IN A DATA PROCESSING SYSTEM

(75) Inventors: James R. H. Challenger, Garrison, NY (US); George Prentice Copeland, Austin, TX (US); Paul Michael Dantzig, Scarsdale, NY (US); Arun Kwangil Iyengar, Yorktown Heights, NY (US); Matthew Dale McClain, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/157,672

(22) Filed: May 29, 2002

(65) Prior Publication Data

US 2002/0143868 A1 Oct. 3, 2002

Related U.S. Application Data

(62) Division of application No. 09/359,275, filed on Jul. 22, 1999, now Pat. No. 6,507,891.

(51) Int. Cl.[7] .............................................. G06F 12/00
(52) U.S. Cl. ...................... 711/141; 711/124; 711/130; 709/203; 709/217
(58) Field of Search .............................. 711/119, 121, 711/124, 126, 130, 144, 156, 141; 709/203, 217, 218, 219

(56) References Cited

U.S. PATENT DOCUMENTS

5,754,774 A * 5/1998 Bittinger et al. ............ 709/203
6,112,242 A * 8/2000 Jois et al. ...................... 707/10
6,138,158 A * 10/2000 Boyle et al. ................. 709/206
6,256,712 B1 * 7/2001 Challenger et al. ..... 707/103 Y

OTHER PUBLICATIONS

Iyengar et al., "Improving Web Server Performance by Caching Dynamic Data", Proceedings on the USENIX Symposium on Internet Technologies and Systems, 1998.
Challenger et al., "A Scalable and Highly Available System for Serving Dynamic Data at Frequently Accessed Web Sites", 1998 High Performance Networking and Computing Conference, pp. 1–23.
Challenger et al., "A Scalable System for Consistently Caching Dynamic Web Data", Infocom 1999, pp. 1–22.

* cited by examiner

Primary Examiner—Matthew Kim
Assistant Examiner—Matthew D. Anderson
(74) Attorney, Agent, or Firm—Duke W. Yee; David A. Mims, Jr.

(57) ABSTRACT

A method and apparatus in a data processing system for caching data in an internal cache and in an external cache A set of fragments is received for caching. A location is identified to store each fragment within the plurality of fragments based on a rate of change of data in each fragment. The set of fragments is stored in the internal cache and the external cache using the location identified for each fragment within the plurality of fragments.

16 Claims, 12 Drawing Sheets

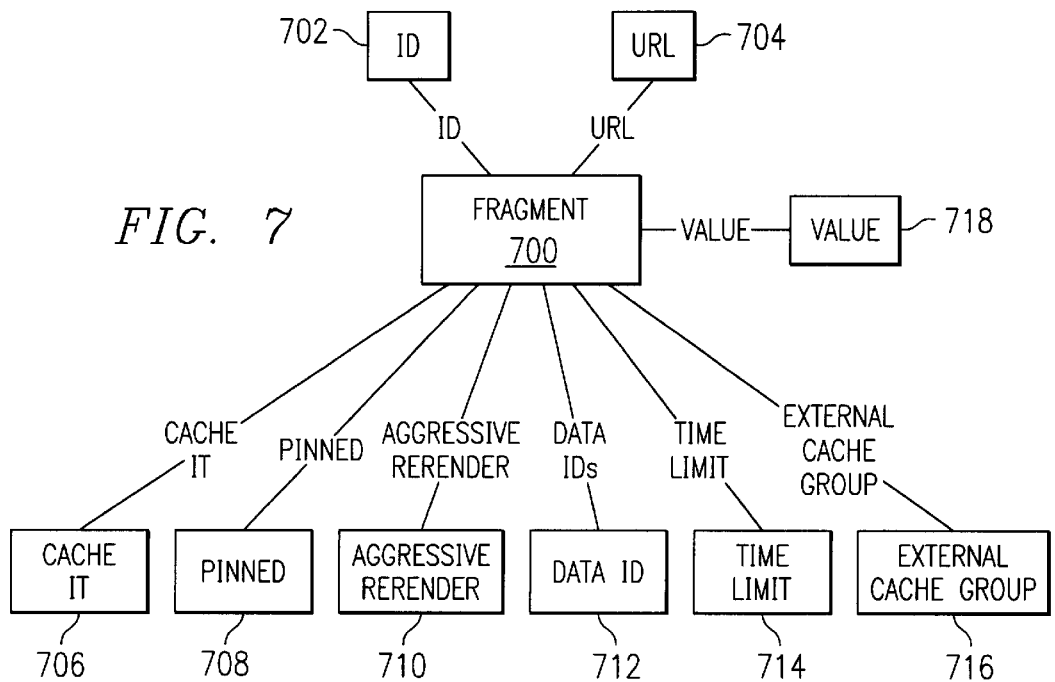

FIG. 7

```
void callPage(String url, HttpServletRequest request)
{
    ...
    servlet = find servlet;
    HandleFragmentInfo(url, request, servlet);
    servlet.service(request, response);
}
void handleFragmentInfo(String url,
                        HttpServletRequest request,
                        HttpServlet servlet)
{
    try {
        id = servlet.getCacheId();
    } catch (NoSuchMethodException e) {
        return;
    }
    if (id == null) {
        return;
    }
    fragmentInfo = new FragmentInfo();
    fragmentInfo.setId(id);
    FragmentInfo.setUri(url);
    request.setFragmentInfo(fragmentInfo);
    return;
}
```

FIG. 8

```
<jsp:directive.taglib uri="/xsp/tagbean/cache/taglib.xml" prefix="cache"/>
<cache:enable>
     <cacheIt>!categoryId.equals("produce")</cacheIt>
     <id>"productDetail-" + productId</id>
     <pinned>false</pinned>
     <aggressiveRerender>false</aggressiveRerender>
     <externalCacheGroupId>"group1"</externalCacheGroupId>
     <dataId>"product-" + productId</dataId>
</cache:enable>
The equivalent JSP syntax without specialized tags would be:
<%! public String
     getCacheId(com.ibm.servlet.engine.SEHttpServiceRequest request)
     {
         return "productDetail-" + productId;
     }
%>
```

FIG. 9

```
<%   FragmentInfo fragmentInfo = request.getFragmentInfo();
     fragmentInfo.setCacheIt(!categoryId.equals("produce"));
     fragmentInfo.setPin(false);
     fragmentInfo.setAggressiveRerender(false);
     fragmentInfo.setExternalCacheGroupId("group1");
     Vector vector = new Vector();
     vector.addElement("product-" + productId);
     fragmentInfo.setDataIds(vector);
%>
```

```
<?xml version="1.0"?>
<jsp:root>
    <jsp:directive.page errorpage="/xsp/test/errorPage.xsp"/>
    <jsp:directive.taglib uri="/xsp/tagbean/cache/cache-taglib.xml"
                prefix="cache"/>
    <%!
        public String
        getCacheId(com.ibm.servlet.engine.SEHttpServiceRequest request)
        {
            return "" + "/xsp/test/cache/publish1/page1.xsp";
        }
    %>
    <%
        Vector vector = new Vector();
        vector.addElement("product-2066-4");
        vector.addElement("shopperGroup-2066-2");

FragmentInfo fragmentInfo = request.peekFragmentInfo();
        fragmentInfo.setTimeLimit(-1);
        fragmentInfo.setPin(false);
        fragmentInfo.setAggressiveRerender(false);
        fragmentInfo.setExternalCacheGroupId("group1");
        fragmentInfo.setDataIds(vector);
    %>
    <html>
      <head>
        <title>Enable JSP caching</title>
      </head>
      <body>
        <%
        System.out.println("out = " + out);
        %>
        Page 1 calling page 2<br/>
        <jsp:request include="/xsp/test/cache/publish1/page2.xsp"/>
        Page 1 returning from page 2<br/>
      </body>
    </html>
</jsp:root>
<?xml version="1.0"?>
<jsp:root>
    <jsp:directive.taglib uri="/xsp/tagbean/cache/cache-taglib.xml"
                prefix="cache"/>
    <%!
        public String
        getCacheId(com.ibm.servlet.engine.SEHttpServiceRequest request)
        {
            return "" +"/xsp/test/cache/publish1/page2.xs";
        }
    %>
    <b>In page 2</b><br/>
</jsp:root>
```

METHOD AND APPARATUS FOR MANAGING INTERNAL CACHES AND EXTERNAL CACHES IN A DATA PROCESSING SYSTEM

CROSS REFERENCE TO RELATED APPLICATIONS

This application is a divisional of application Ser. No. 09/359,275, filed Jul. 22, 1999, now U.S. Pat. No. 6,507,891.

The present invention is related to applications entitled METHOD AND APPARATUS FOR HIGH-CONCURRENCY CLIENT LOCKING WITH JAVA IN A DATA PROCESSING SYSTEM, Ser. No. 09/359,274, METHOD AND APPARATUS FOR CACHE COORDINATION FOR MULTIPLE ADDRESS SPACES, Ser. No. 09/359,276, METHOD AND APPARATUS FOR INVALIDATING DATA IN A CACHE, Ser. No. 09/359,277, METHOD AND APPARATUS FOR AGGRESSIVELY RENDERING DATA IN A DATA PROCESSING SYSTEM, Ser. No. 09/359,278, and A METHOD AND APPARATUS FOR CACHING CONTENT IN A DATA PROCESSING SYSTEM WITH FRAGMENT GRANULARITY, Ser. No. 09/359,279, all of which are filed even date hereof, assigned to the same assignee, and incorporated herein by reference.

BACKGROUND OF THE INVENTION

1. Technical Field

The present invention relates generally to an improved data processing system and in particular to a method and apparatus for caching data in a data processing system. More specifically, the present invention relates to a method and apparatus for caching documents containing dynamic content.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser.

Web content is often dynamic because of various changes made by developers and other users publishing or making available web content, such as Web pages. Even static pages are occasionally updated. Web servers provide static content and dynamic content to various users. Static content contain data from files stored at a server. Dynamic content is constructed by programs executing at the time a request is made. The presence of dynamic content often slows down Web sites considerably. High-performance Web servers can typically deliver several hundred static pages per second. By contrast, the rate at which dynamic pages are delivered is often one or two order of magnitudes slower.

Dynamic content is often present at a web site in an effort to provide customized pages and updated information to various users that may visit the site. The use of this type of Web page, however, may cause a web site to slow down in performance.

Proxy caches are used to store data at sites that are remote from the server which originally provided the data. Proxy caches reduce network traffic and latency for obtaining Web data because clients can obtain the data from a local proxy cache instead of having to request the data directly from the site providing the data. This mechanism, however, does not work well with dynamic pages. One problem presented by dynamic pages cached in proxy servers is that it is essential for the cache pages to be current at all times.

Therefore, it would be advantageous to have an improved or alternative mechanism for caching and handling dynamic content.

SUMMARY OF THE INVENTION

The present invention provides a method and apparatus in a data processing system for caching data in an internal cache and in an external cache A set of fragments is received for caching. A location is identified to store each fragment within the plurality of fragments based on a rate of change of data in each fragment. The set of fragments is stored in the internal cache and the external cache using the location identified for each fragment within the plurality of fragments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a diagram of metadata used to cache a fragment depicted in accordance with a preferred embodiment of the present invention;

FIG. 8 is a diagram illustrating statements for use in a RequestDispatcher.include( ) method depicted in accordance with a preferred embodiment of the present invention;

FIG. 9 is a diagram illustrating instructions used to add a get cache method to a JSP depicted in accordance with a preferred embodiment of the present invention;

FIG. 10 is a diagram of instructions used in a service method depicted in accordance with a preferred embodiment of the present invention;

FIG. 11 is an example of a JSP depicted in accordance with a preferred embodiment of the present invention;

DETAILED DESCRIPTION OF THE PREFERRED EMBODIMENT

Figure 1:
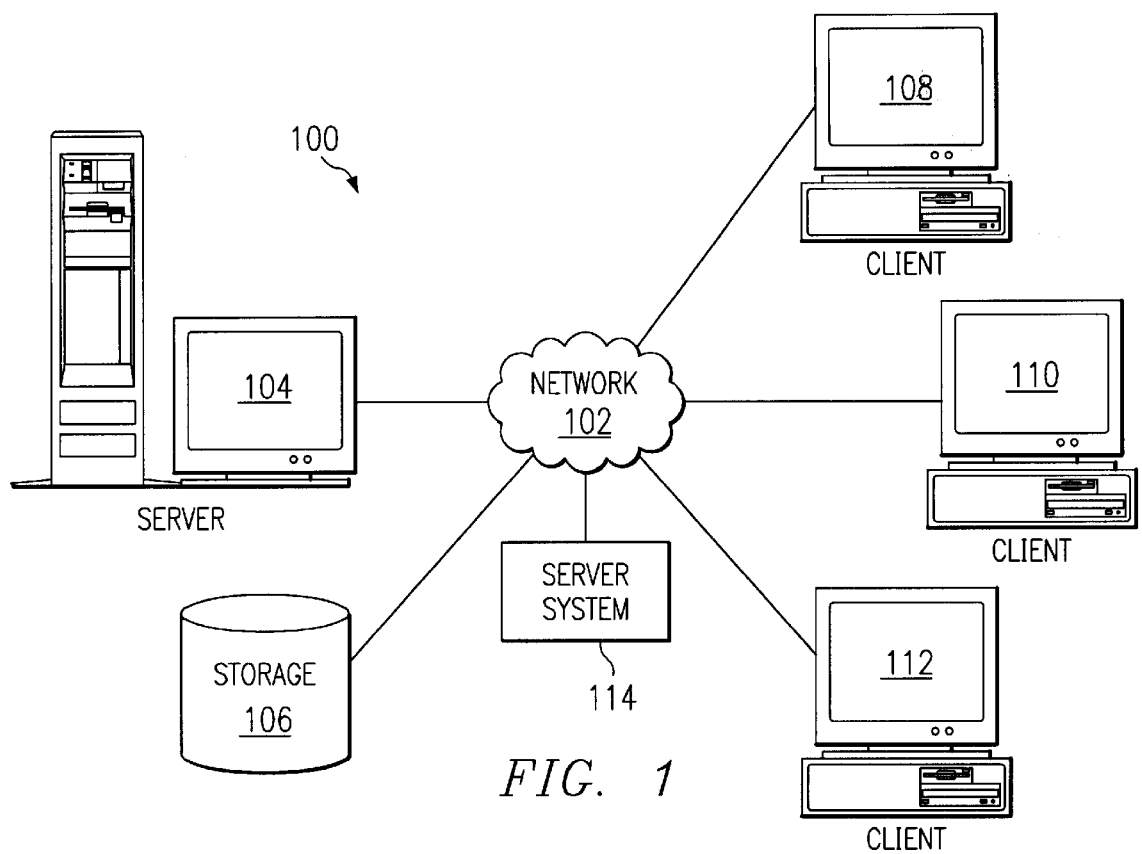
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 includes a server system 114, which also may provide data to clients 108–112. Server system 114 may take various forms. For example, server system 114 may consist of two or more servers that have been logically associated with each other or may actually be interconnected as a cluster. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as, for example, an intranet, a local area network (LAN), or a wide area network (WAN). FIG. 1 is intended as an example, and not as an architectural limitation for the present invention.

Figure 2:
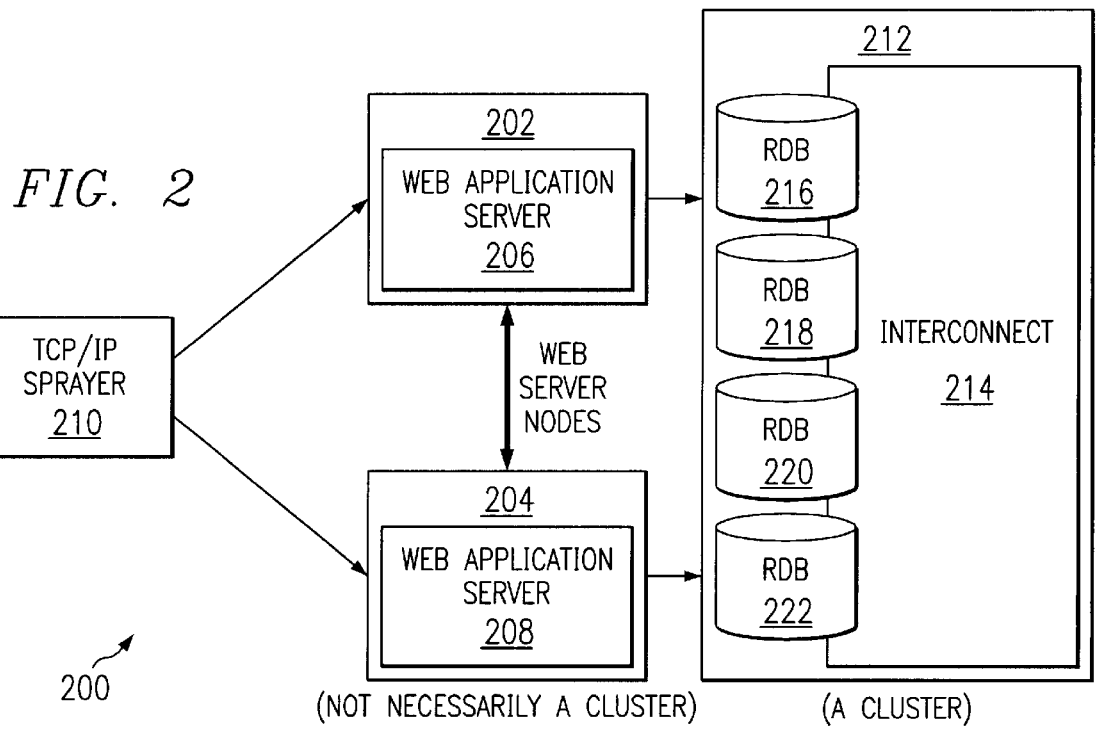
FIG. 2 is a block diagram of a server system depicted in accordance with a preferred embodiment of the present invention.

With reference now to FIG. 2, a block diagram of a server system is depicted in accordance with a preferred embodiment of the present invention. Server system 200 is an example of a server system that may be implemented as server system 114 in FIG. 1. Server system 200 illustrates a mechanism in which a web application achieves throughput scale up and high availability. In this example, server system 200 contains Web server nodes 202 and 204, which execute Web application servers 206 and 208 respectively. The use of the term "server" may refer to either the physical data processing system or to an application providing receiving and processing requests from a client. Similarly, the client may be a physical data processing system or an application. For example, a client application would be a Web browser. Server system 200 also includes a sprayer 210 which is connect to Web server nodes 202 and 204. Sprayer 210 is a TCP/IP sprayer and acts as a cache that is external to Web server nodes 202 and 204. A sprayer performs the function of spreading requests to multiple webserver/application server nodes. Not all sprayers have the proxy function. A sprayer can also perform the function of a proxy server. The sprayer is closer to the client than the application server and it may contain its own cache. Sprayer 210 is used to distribute HTTP requests evenly among the web servers, such as Web servers located in Web server nodes 202 and 204. Sprayer 210 typically uses a time out to detect when one of the Web server nodes can no longer respond, so it can be taken off the sprayer's list of available nodes and a notification sent to an administrator.

Web server nodes 202 and 204 typically coordinate via shared data (e.g., a distributed file system or database system). These data mechanisms can themselves scaleup via their own form of parallelism. In the depicted example, this sharing of data is accomplished through shared parallel database 212, which contains an interconnect 214 providing a connection between storage devices 216–222. These storage devices form a cluster and are shared by both Web server node 202 and Web server node 204. These storage devices contain relational databases from which content is pulled by Web server nodes 202 and 204 to dynamically create pages. In this example, these pages are distributed to sprayer 210 for further distribution to clients.

The depicted configuration for server system 200 is intended as an example and is not meant to imply architectural limitations with respect to the present invention.

Figure 3:
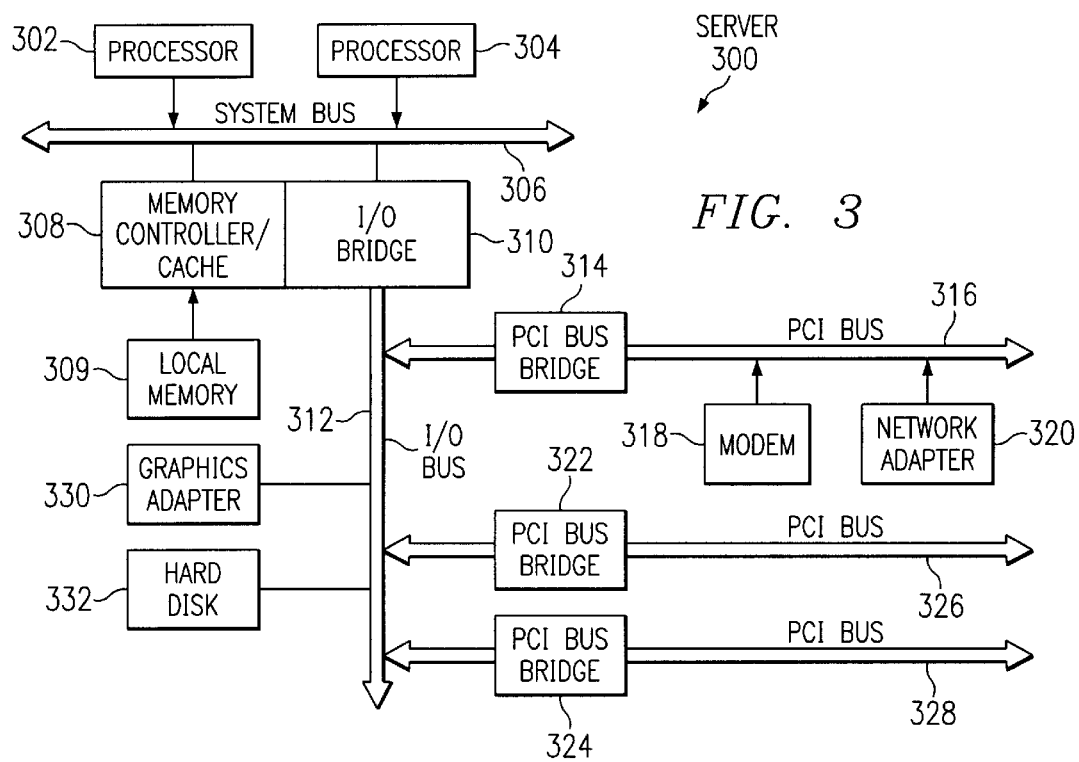
FIG. 3 is a block diagram depicting a data processing system that may be implemented as a server in accordance with a preferred embodiment of the present invention.

Referring to FIG. 3, a block diagram depicts a data processing system that may be implemented as a server, such as server 104 in FIG. 1, Web server node 202, or Web server node 204, in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to network computers 108–112 in FIG. 1 may be provided through modem 318 and network adapter 220 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000 system, a product of International Business Machines Corporation in Armonk, N.Y., running the Advanced Interactive Executive (AIX) operating system.

Figure 4:
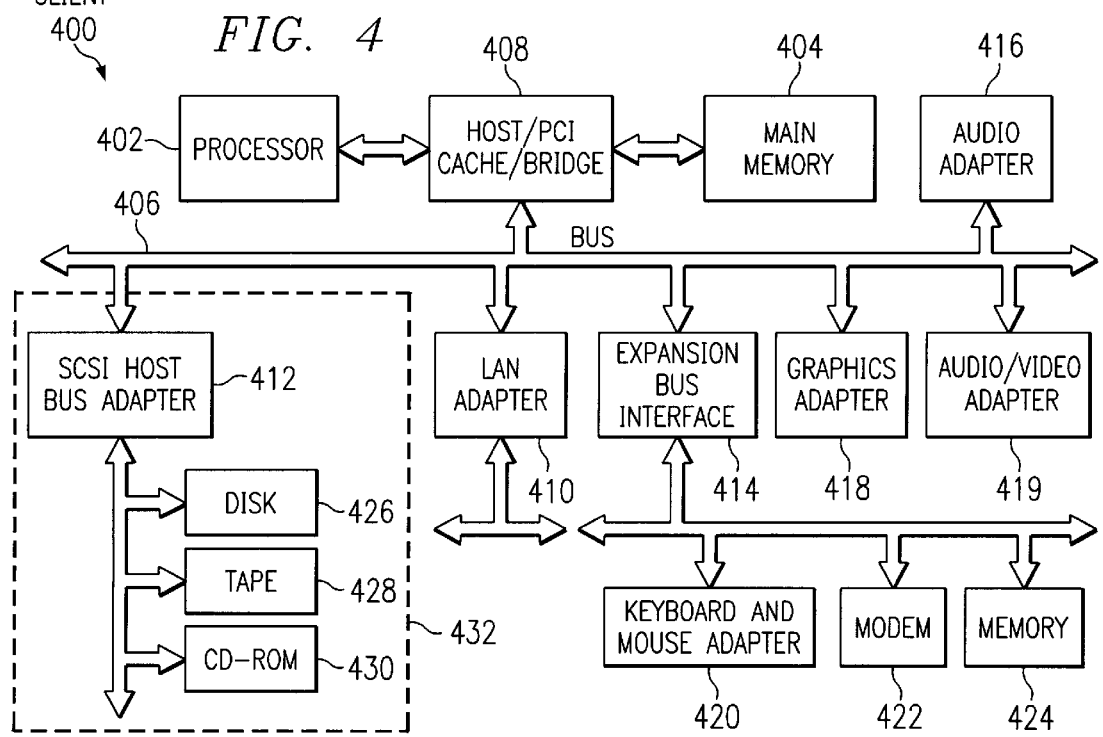
FIG. 4 is a block diagram illustrating a data processing system in which the present invention may be implemented.

With reference now to FIG. 4, a block diagram illustrates a data processing system in which the present invention may be implemented. Data processing system 400 is an example of a client computer. Data processing system 400 employs a peripheral component interconnect (PCI) local bus architecture. Although the depicted example employs a PCI bus, other bus architectures such as Micro Channel and ISA may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430, as noted by dotted line 432 in FIG. 4 denoting optional inclusion. In that case, the computer, to be properly called a client computer, must include some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a Personal Digital Assistant (PDA) device which is configured with ROM and/or flash ROM in order to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

The present invention provides a method, apparatus, and instructions for caching dynamic content. The mechanism of the present invention is especially useful in caching Web content, such as Web pages. In particular, the mechanism of the present invention may be used to provide caching for Web pages containing data having different rates of change.

Figure 5:
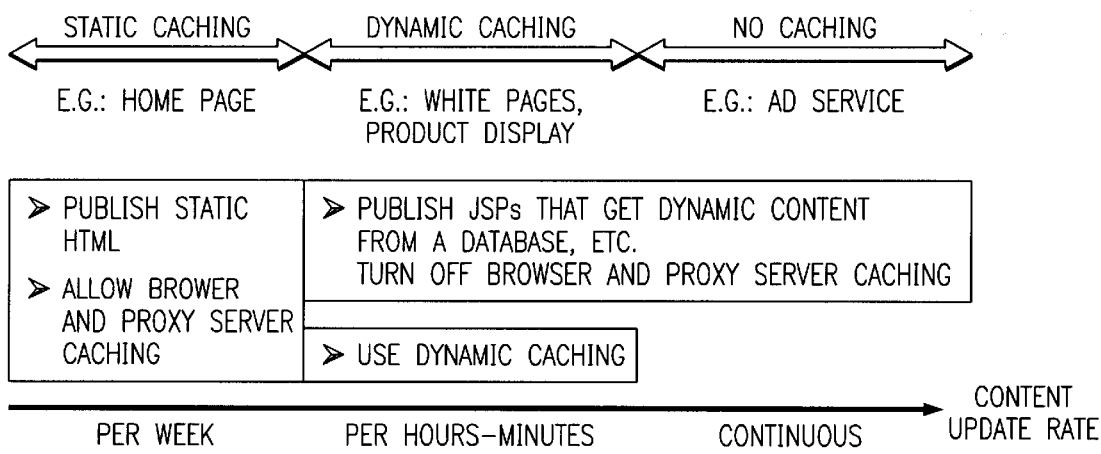
FIG. 5 is a diagram illustrating examples of different update rates and caching for pages depicted in accordance with a preferred embodiment of the present invention.

Turning to FIG. 5, a diagram illustrating examples of different update rates and caching for pages is depicted in accordance with a preferred embodiment of the present invention. FIG. 5 shows update rates for various types of pages as well as the type of caching that may be used.

Generally, caching is more beneficial as the access rate increases and as the update rate decreases. All Web content is somewhat dynamic because everything changes eventually, even static pages. For example, if content changes very infrequently, then it is convenient for a human to republish the Web site whenever its content changes. An example of this type of content is a typical home page. It is usually safe to enable browser and proxy server caching.

If content changes so often that it is unreasonable to republish the Web site every time it changes, then a template, such as a Java Server Page (JSP), may be used to dynamically get the content from a file or database, and then render (i.e., format) the content into a HTML page. An ad service is an example of content that may change each time a page is requested. A JSP and a servlet are both mechanisms, which use Java standards for programming dynamic content. A JSP is aimed at Web application designers and servlets are aimed at programmers. A JSP is compiled into a servlet for execution. In this case, static caching in browsers and proxy servers may be disabled, and dynamic caching may or may not be useful.

If the content is constant over a large number of requests, then performance can be significantly improved by using dynamic caching. Examples of content that is fairly consistent are products in e-commerce and white pages as shown in FIG. 5. With dynamic caching, either time limit or a data ID invalidation mechanism can be used to keep the content in the cache up to date. One way to view this case is that it automates the publishing process so that high update rates can be handled.

If the content changes continuously, such as, for example, a ticker tape, any form of caching is a bad idea because caching overhead is suffered with no benefit. JSPs may be used to generate a page containing this content without any caching.

Caching rendered HTML content offers performance improvements when the underlying dynamic content has not changed. One performance improvement is avoiding access to backend servers to get the dynamic content. The access avoided to backhand servers includes, for example, accessing a database, a transaction monitor, an internal application, or a news service. Additionally, rendering the dynamic content into HTML is avoided.

Caching the underlying dynamic content (i.e., data) instead of HTML requires rendering the data into HTML during the fast path (i.e., when there is a cache hit). However, the fast path occurs more often. When the same data is rendered in multiple ways, caching rendered HTML requires accessing the backend server once for each rendering. The tradeoff is difficult to make because it is between avoiding a typically less expensive activity (i.e., rerendering) vs. infrequently avoiding a typically more expensive activity (i.e., backend access). The processes of the present invention may provide advantages for caching of data and in particular for caching rendered pages, such as those in HTML format. Rendering occurs when a server template (eg, a JSP) is executed and it returns a format which can be read by its requester. Reader is an agent of the requester which can display the rendering to its client (another person or program). Readers would include HTML browsers, Acrobat pdf viewers, or Internet agents. A fragment is rendered the first time by an external HTTP request asking for contents of a servlet/JSP/ASP/cgi program to execute. Rerendering is the process of reusing the stored request object to re-render the same fragment by re-executing the servlet/JSP.

The change rate or update rate also determines whether dynamic content (via a template) should be used instead of static content. Static content requires redoing the pages and republishing the site wherever something changes. A dynamic content template goes to the database or file system to read the latest data, formats it into HTML (called rendering), and returns it to the client. For sites that have something that changes often, dynamic content templates make the site manageable.

Figure 6:
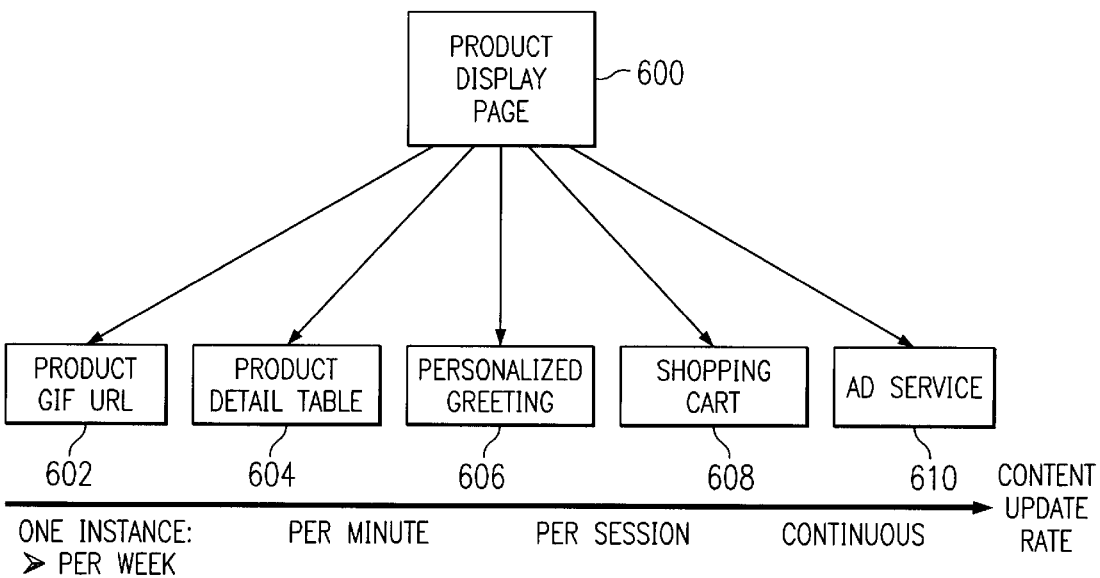
FIG. 6 is a diagram illustrating page fragments depicted in accordance with a preferred embodiment of the present invention.

With reference now to FIG. 6, a diagram illustrating page fragments is depicted in accordance with a preferred embodiment of the present invention. One mechanism provided by the present invention to provide improved caching of content is to define content in a page as one or more fragments and cache the fragments individually, rather than as a single page.

A fragment is a part or all of a rendered HTML page which can be cached. A fragment can contain 0 or more child fragments, and can be contained by 0 or more parent fragments, forming a directed acyclic graph (DAG). FIG. 6 illustrates a returned page 600, which is a product display page. Page 600 is a "top-level" fragment made up of 5 child fragments. Page 600 includes a product gif URL fragment 602, a product detail fragment 604, a personalized greeting fragment 606, a shopping cart fragment 608, and an ad service fragment 610. The fragments depicted in FIG. 6 are shown in order of increasing rate of change for the underlying content in the fragment with product gif URL 602 having the slowest rate of change and ad service fragment 610 having the fasted rate of change. Product gif URL fragment 602 contains a hypertext reference (HREF) that specifies the URL of the file for an image that shows what the product looks like.

Product detail fragment 604 in this example may be a formatted table that includes the detailed description of the product with details, such as the product order number, name, options, and price. Personalized greeting fragment 606 is a fragment including a greeting that is directed towards the user, such as, for example, "Hello, John! Welcome to AcmeCorp.". Shopping cart fragment 608 in this example is a formatted shopping cart, including the order number, name, quantity and price of the products that have been chosen for possible purchase.

Ad service fragment 610 includes a HREF for an image that displays an advertisement. The advertisement href is different each time a page is sent to a shopper. This makes page 600 as a whole too volatile to cache. However, fragment granularity allows the other portions of page 600 to be cached.

The HREF to the product image in product gif URL fragment 602 and the detailed product description in product detail table fragment 604 are excellent candidates for fragments to be cached because the underlying data of a particular product changes infrequently. However, the underlying data of some product changes far too frequently for static publishing.

The personalized greeting in personalized greeting fragment 606 has the lifetime of a user session, but only for a particular shopper. It may be used several times within a fairly short time interval. Thus, personalized greeting fragment 606 is a good candidate for dynamic caching. Shopping cart fragment 608 changes multiple times within a user session (every time something is added or the quantity changes), so it is not as good a candidate for dynamic caching as the personalized greeting. If, however, shopping cart fragment 608 is included on every page returned to the shopper, then shopping cart fragment 608 is typically returned several times between changes, so there is a reasonable case for caching it. The advertisement HREF in ad service fragment 610 is a poor candidate for caching because the hit ratio would be zero and caching has its own overhead (i.e., storing it in the cache and invalidating it). Of course, each child fragment may contain additional fragments.

Turning next to FIG. 7 a diagram of metadata used to cache a fragment is depicted in accordance with a preferred embodiment of the present invention. Fragment 700 is stored in a cache, which is referred to in these examples as a "fragment cache". In FIG. 7, fragment 700 includes a fragment ID 702, which identifies fragment 700 within a fragment cache. Fragment ID 702 is selected to be unique within a fragment cache. This uniqueness may be with respect to a process within a server (if each server process has its own fragment cache instance), a server (if a fragment cache instance is shared across the processes within a server), or a cluster of servers (if a fragment cache instance is shared across multiple nodes in a cluster). A fragment ID, such as fragment ID 702, is typically computed using processes on a JSP template. Fragment ID 702 can be the URL, the URL plus some request attributes, or not directly related to the URL.

Fragment ID 702 can be used to enforce security by adding user information. The above example of a product description fragment does not enforce security. It uses an ID that includes the fact that it is a product detail fragment and the product order number (e.g., "productDetail—TA23434"). However, if shopper groups are supported that have different prices and/or a different subset of the products, then the ID might also include the shopper group (e.g., "productDetail—SG188—TA23434"). Placing this additional information in fragment ID 702 prevents a shopper that is not in the shopper group from simply changing the URL to obtain or access cached information, provided the cache is accessed within the application after authentication.

Fragment 700 also contains a URL 704, which is the URL relative to the server for this fragment. For a top-level fragment (e.g. a JSP that is externally requested), this could be obtained from the HTTP request object's URL. For a contained fragment, this is the JSP file name URL.

Fragment 700 also contains a cache it 706 indicator, which is metadata identifying whether the fragment should be cached. Cache it 706 allows a runtime decision about whether a particular instance (fragment) of the JSP should be cached. For example, on a product display JSP, it may be known that products from a certain category are either accessed too infrequently or changed too frequently to be cached worthwhile caching.

Next, pinned 708 provides an option of allowing least recently used (LRU) replacement to be applied to the fragment. Reasons for choosing the "pinned" option might be real-time requirements or the fact that the web developer knows better than a LRU algorithm.

Aggressive render 710 is metadata that is used to indicate whether to aggressively render a fragment when it is invalidated or when its time limit expires, instead of waiting for an external request that needs the fragment. With this aggressive rerender option, either a time limit or data ID invalidation may cause the value of fragment 700 to be set to null and fragment ID 702 to be put on a queue to be rerendered when idle time permits. When this option is turned off, a time limit or data ID invalidation causes fragment 700 to be removed from the cache. It will be rerendered and put back in the cache only when needed by an external HTTP request.

Aggressive rerendering can exploit the idle time of the server by rendering pages in a background mode. The use of this option is similar to automating the publishing process.

Data ID 712 may be used to set data IDs that represent the underlying data which cause the fragment to be invalidated. Fragment 700 can use zero or more pieces of data, so that fragment 700 can have zero or more data IDs. A piece of data can be used in one or more fragments, so a data ID can have one or more fragments. When the raw data changes, then its data ID is used to invalidate all the fragments that depend on it. It must be unique within the same scope as the fragment ID. When a piece of data is used in only one fragment, the data ID can be the same as the fragment ID.

In the depicted example, the fragment ID will always be one of the data IDs. When a piece of data is used in multiple fragments, its data ID would be different from either of the fragment IDs. A database trigger might be used to create the external event that initiates the invalidation.

Fragment 700 also includes time limit 714, which is metadata that may be used to set a maximum time limit that fragment 700 should be cached without its value being updated. The time granularity is configurable. For the web developer, this is simpler than setting data IDs because there are no triggers to write. However, it causes many fragments to be discarded and rerendered when they are actually still valid. A negative value implies that no time limit exists.

Next, external cache group 716 may contain an ID for a group of external caches that are written to when a page-level fragment is rendered or invalidated. A page level fragment is invalidated when the page fragment is invalidated.

Fragment 700 also contains value 718 which is the cached rendering of the fragment. For a fragment that contains child fragments, the fragment can be stored in the cache in either of the following forms:

With each child fragment fully expanded.

With each child fragment represented by a link to the child fragment which can be expanded when the parent is returned. Each link includes both the child's fragment ID and URL. The fragment ID is needed to expand the child in the case when the child fragment is in the cache. The URL is needed to expand the child in the case when the child fragment is not in the cache. The advantages of the linked representation are:

Reduced storage because the child fragments are not replicated.

The parents does not have to be invalidated when a contained child is invalidated.

The child fragment's cache access frequency statistics are more accurate because the child is accessed from the cache each time it is used.

All of the above caching metadata illustrated in FIG. 7 is supplied in the cached fragment's JSP. This information is supplied using a FragmentInfo object, which is a simple struct object.

Application tailorable ids are also provided for in accordance with a preferred embodiment of the present invention. All of the ids are determined by the application. For example, a cache entry for a product display page might have the form of "productDisplay—TA23724", where the "productDisplay-" part is the same for all product display pages and the "TA23724" is the individual product ID that is different for each product.

The API for including in a page another servlet, another JSP or an HTML file is a Requestdispatcher.include( ) method. A JSP that uses caching would be called using this same mechanism. The called JSP contains all of its own caching metadata.

With reference next to FIG. 8, a diagram illustrating statements for use in a RequestDispatcher.include( ) method is depicted in accordance with a preferred embodiment of the present invention. The statements in FIG. 8 represent instructions that are added to a JSP that is to be cached.

With reference now to FIG. 9, a diagram illustrating instructions used to add a get cache method to a JSP is depicted in accordance with a preferred embodiment of the present invention. These instructions are used to allow the JSP to obtain a cache ID. Next, in FIG. 10, a diagram of instructions used in a service method is depicted in accordance with a preferred embodiment of the present invention. The service method is the code that is executed in a JSP/servlet when an HTTP (do post, do get) request is sent. The service method contains the logic to "render" a page.

Turning now to FIG. 11, an example of a JSP is depicted in accordance with a preferred embodiment of the present invention. JSP 1100 includes instructions for defining methods on servlets, which can be called to obtain the ID of the page before the rest of the page is cached or run. "<%! %>" defines a function to return the "cache ID" of this instance given an HTTP request and response. This will be called before any rendering happens. "<% %>" defines the rest of the metadata for the fragment. When caching fragments, two types of locations may be used, an external cache and an internal cache. A wide variety of caches exist that are external to the web application server. For example, external caches may include those in a web server, operating system, and a sprayer. In the depicted examples, an internal cache is a cache that is part of the web application server engine. When a JSP template page containing requests for dynamic content is executed, the resulting rendered fragment is cached.

An external cache offers better cost-performance than a web application server which supports the flexibility and protection required for application code. An external cache can even be supported in data processing systems that do not have the overhead of an operating system (e.g. multiple processes/threads, memory management). Also, external caches are closer to the client. These type of systems can have a very large cost-performance advantage.

The advantages of an internal cache include fragment granularity that can be exploited. For example, if part of a page is too volatile to cache, the rest of the page can still be cached. With an external cache, only whole pages, also referred to as fragments can be cached. Consequently, these pages cannot contain content that is too volatile to cache.

A further advantage of an internal cache is that access control can be enforced, causing a page to be accessible to only a selected group. For example, the product description pages may be different for different shopper groups. With an external cache, authentication is not performed except for firewall enforcement, so the pages must be accessible to everyone within that security domain.

Figure 12:
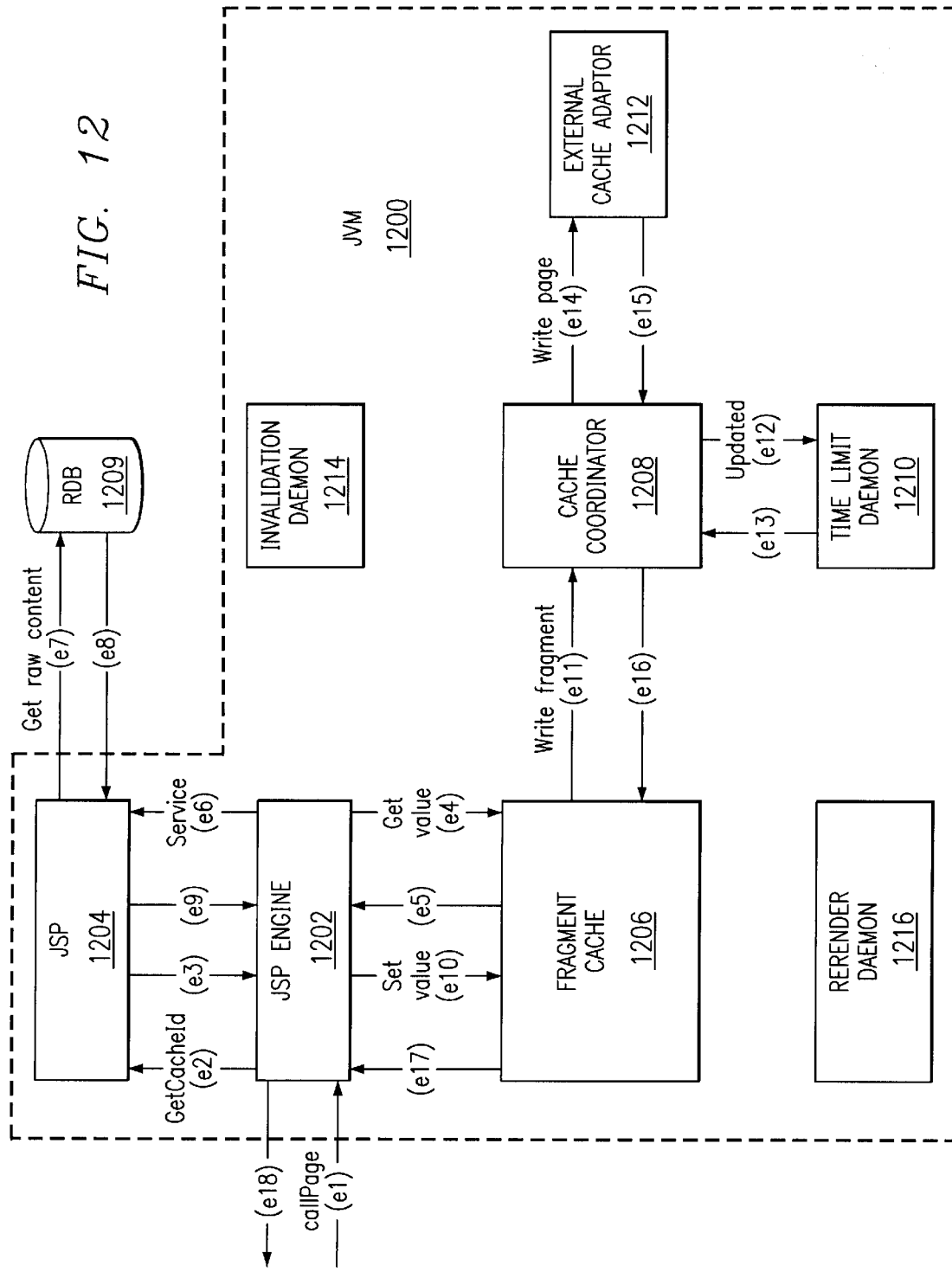
FIG. 12 is a data flow diagram illustrating the handling of an external request from a client for content depicted in accordance with a preferred embodiment of the present invention.
Figure 13:
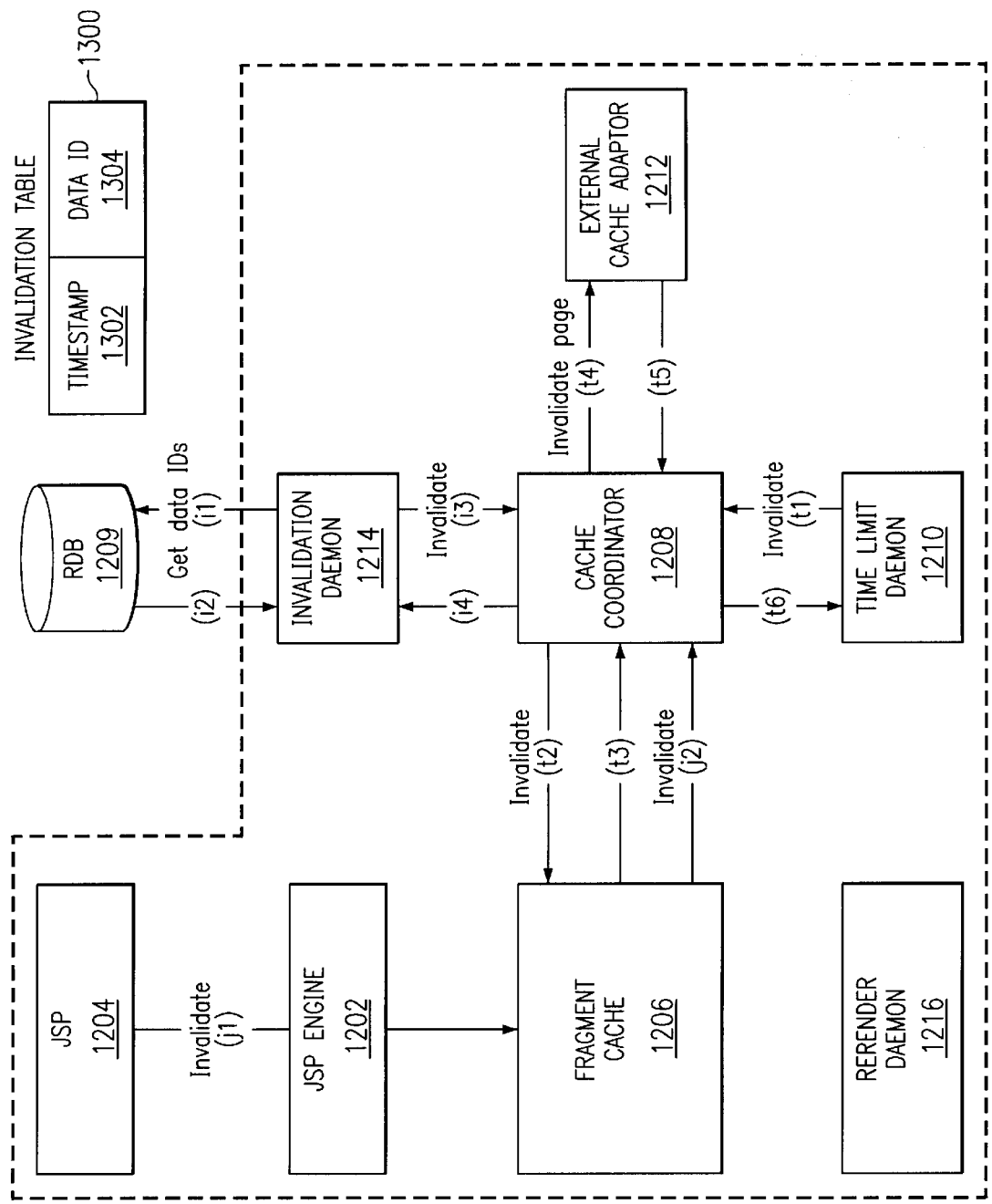
FIG. 13 is a data flow diagram showing handling of a data ID or fragment ID invalidation depicted in accordance with a preferred embodiment of the present invention.
Figure 14:
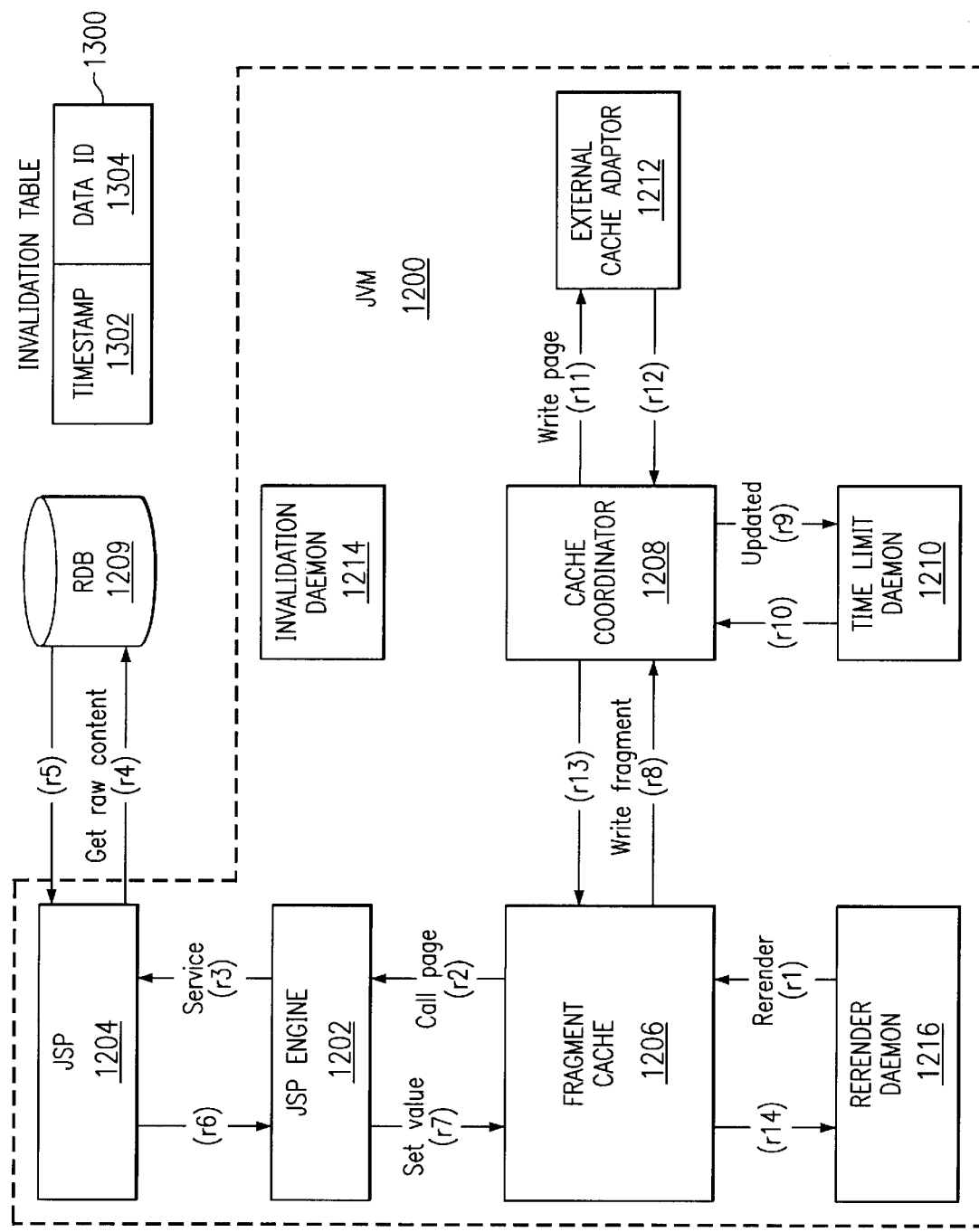
FIG. 14 is data flow diagram illustrating aggressive rerendering depicted in accordance with a preferred embodiment of the present invention.

A Web application server of the present invention includes an internal cache that can also push results of selected pages to external caches. This mechanism allows a decision at a JSP template page granularity to be made as to whether that template would be pushed to an external cache versus an internal cache. Those templates that satisfy the above conditions could exploit the cost-performance advantage of an external cache. Other templates could use the flexibility of the internal cache. In the figures described below, a mechanism for implementing internal and external caches are illustrated in accordance with a preferred embodiment of the present invention. After a page has been rendered, the resulting fragment is pushed to the cache coordinator. The cache coordinator looks at the "externalCacheGroupId" of the fragment. If the cache group is a valid cache group defined in this environment, then it will push the fragment to the external caches in that cacheGroup. Mapping of externalCacheGroup ID to a list of all adapters that are a part of that externalCacheGroup. As elements are pushed to the various external caches, some information is maintained to invalidate. This information includes, for example, mapping of fragment data IDs to URLs and mapping of URIs (templates) to URLs. Both are used to invalidate a large number of rendered pages in the external caches depending on either data IDs or their template (URI). FIGS. 12–14 provide illustrations of data flow used in caching dynamic content for Web applications. The examples in FIGS. 12–14 are all described with respect to a single Web application server (WAS) Java virtual machine (JVM). Java™ is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The term "JVM" is a Java specific term for "address space". As used herein, JVM is interchangeable with "address space". The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to particular computer architectures. A bytecode is a machine independent code generated by the Java compiler and executed by a Java interpreter.

A development environment, such as the Java Development Kit (JDK) available from Sun Microsystems, Inc., may be used to build Java byte code from Java language source code and libraries.

Turning now to FIG. 12, a data flow diagram illustrating the handling of an external request from a client for content is depicted in accordance with a preferred embodiment of the present invention. In running a JSP, the JSP is compiled into a servlet and the servlet is compiled into a class file if a compiled servlet is not more recent than a corresponding JSP.

The execution of a JSP is triggered by an incoming request for a page received in JVM 1200 by JSP engine 1202

(step e1). This request in the depicted example is a RequestDispatcher.include( ) request in a HTTP format. This request may be received from a client or from another JSP in JVM 1200. JSP engine 1202 then calls a getCacheId method on JSP 1204 (step e2). In this example, with the HTTP request, JSP 1204 is a top level JSP, which may contain a HTML in line or may contain request to include a static HTML, Java code to dynamically generate HTML, or request execution of another JSP using the RequestDispatcher.include( ) method.

JSP engine 1202 receives a response from JSP 1204 (step e3). The JSP engine tries to determine whether the HTML content is cached from the returned response. This determination is made by sending a get value request to fragment cache 1206 (step e4). The request for the value is made using the response returned from JSP 1204. A response is returned by fragment cache 1206 to JSP engine 1202 (step e5). If cached content is not present in a response from fragment cache 1206, JSP 1204 is executed by calling the JSP's service method (step e6). Step e6 occurs without executing step e4 if the response returned in step e3 is null.

In response, JSP 1204 accesses a relational database (RDB) 1209 to obtain dynamic content by sending a message to RDB 1209 to obtain raw content (step e7). This message may be, for example, an SQL query or a call to stored procedure. RDB 1209 may be located, for example, at a back end server. A response is returned containing the raw or dynamic content (step e8). JSP 1204 will then render the dynamic content into a HTML format. Once the rendering has been performed (logic in the servlet/JSP has been executed) the fragment contains both the value (the rendering) and the metadata required to maintain the fragment in the cache. The resulting HTML content is sent to JSP engine 1202 by JSP 1204 (step e9). In turn, this content is placed into fragment cache 1206 by JSP engine 1202 (step e10). Fragment cache 1206 then calls cache coordinator 1208 to write the fragment for handling by cache coordinator 1208 (step e11). Cache coordinator 1208 functions to maintain all of the caches in synchronization.

If the fragment has a time limit, cache coordinator 1208 will send an update message to time limit daemon 1210 with the new value to update the expiration time (step e12). A response is returned by time limit daemon 1210 to cache coordinator 1208 (step e13).

If the fragment is for an external cache, then the page is written to an external cache adapter 1212, which results in the HTML content being sent to an external cache (step e14). The fragment may be assigned to a cache group. In such an instance, the fragment is written to each cache in that group. External cache adapter 1212 is a local adapter object that encapsulates the protocol used by the external cache. In other words, external cache adapter 1212 serves as an interface to the external cache or caches. A response is returned by external cache adapter 1212 to cache coordinator 1208 (step e15). This response indicates whether the write was successful. The response is then sent to fragment cache 1206 (step e16), which in turn is sent to JSP engine 1202 (step e17). The HTML content is then returned to the party sending the RequestDispatcher.include( ) message (step e18).

With reference again to step e5, if the HTML content is cached, JSP 1204 does not have to be executed and the cache content may be returned to the calling entity requesting the page.

JVM 1200 also includes an invalidation daemon 1214 and a rerender daemon 1216, whose functions will be described in more detail below. When an HTTP request is made, the request flows through the external cache resource before the request makes it to the Web application server. The external cache resource will realize it has the value the request is looking for and return it to the client instead of burdening the Web application server from rendering or retrieving it from the WAS cache.

Turning next to FIG. 13, a data flow diagram showing handling of a data ID or fragment ID invalidation is depicted in accordance with a preferred embodiment of the present invention. In this example, time limit daemon 1210 maintains a list of fragments and time limits for expiration. In these examples, a change to a value in a fragment results in an update to a time limit for the fragment. This update includes increasing the expiration time to be equal to the current time remaining plus the time limit for the fragment. In other implementations, other mechanism may be used. For example, the current time remaining may be reset to the time limit.

In FIG. 13, time limit daemon 1210 wakes periodically to see if any fragments have expired. If a fragment has expired, time limit daemon 1210 sends an invalidation signal to cache coordinator 1208 (step t1). Upon receiving notification that a fragment's time limit has expired, cache coordination 1208 sends a call to the caches to indicate that the fragment is no longer valid. In this example, cache coordinator 1208 sends an invalidate message to fragment cache 1206 (step t2), which results in a response or reply being returned to cache coordinator 1208 (step t3). The message includes the fragment ID. In addition, cache coordinator 1208 sends an invalidate page message to external cache adapter 1212 (step t4). A response also is returned by external cache adapter (step t5). These responses indicate the success or failure to invalidate the fragment. Cache coordinator sends a reply back to time limit daemon 1210 (step t6). Additionally, a data ID or fragment ID invalidation may be initiated by calling either fragment cache 1206 or cache coordinator 1208. A JSP, such as JSP 1204, has access to its local fragment cache, fragment cache 1206, using a static variable and may send a call through JSP engine 1202 to invalidate a fragment (step j1). The fragment cache implements this call by forwarding the call to cache coordinator 1208 (step j2). At that point, steps t2–t5, as described above, occur to invalidate the fragment.

If data is updated by a source other than JSP 1204 within JVM 1200, then the use of a database trigger for invalidations is employed in the depicted example. In accordance with the preferred embodiment of the present invention, a database trigger is employed by inserting a record into validation table 1300 in the database in RDB 1209. The record in this example includes a time stamp column 1302 and a data ID column 1304. The time stamp in time stamp column 1302 will indicate when the trigger record was created in invalidation table 1300. The data ID in data ID column 1304 represents the data that has been updated.

Data IDs can refer to whatever granularity is appropriate. In the above example, an update to a product record with a primary key of "TA23434" would trigger inserting a record in the invalidation table with an data ID of "product—TA23434".

Invalidation daemon 1214 is a thread that runs periodically to perform a cache invalidation algorithm each time it wakes up. Invalidation daemon 1214's only state is the latest timestamp it has already processed and the length of its wake interval. Invalidation daemon 1214 reads records from invalidation table 1300 in RDB 1209 (step i1). The records read from invalidation table 1300 are those where the timestamp is greater than the latest timestamp it previously processed. For the above example, the record with a data ID of "product—TA23434" would be found in response to reading invalidation table 1300 in step i1. The results are returned to invalidation daemon 1214 (step i2).

Invalidation daemon 1214 sends a notification to cache coordinator 1208 to invalidate any fragments with the specified data ID (step i3). As a result, cache coordinator 1208 performs steps t2–t5 as described above. A response is sent from cache coordinator 1208 to invalidation daemon 1214 (step i4). In the depicted example, the fragment whose fragment ID was "productDetail—TA23434" would be invalidated.

Further, invalidation daemon 1214 will remember the latest timestamp in the retrieved records. Invalidation daemon 1214 will sleep for a configured interval before awaking and performing the process again.

With respect to rerendering fragments, if a fragment's aggressive rerender option is not set and an invalidation occurs, it is simply removed from the cache as soon as it is no longer pinned as indicted by pinned metadata associated with the fragment. If the aggressive rerender option is set and an invalidation occurs, the fragment's value is set to null and its fragment ID is put on a queue to be rerendered as soon as it is no longer pinned. For all fragments invalidated by a single invalidation notification, all of their values are set to null prior to any being put on a rerender queue, so that inconsistent fragments are avoided. The rerender queue is located inside the FragmentCache. The fragment cache is responsible for adding and removing elements from the queue. A configurable number of rerender threads are present, which look in the queue to determine which fragments they can possibly render. The queue only contains cache IDs which have been rendered by this fragment cache and can be rerendered by this cache. To be able to rerender a fragment, its request object is copied and saved in the fragment cache along with the rest of the fragment's caching metadata. The request object is saved only when the aggressive rerender option is set. The request object is a standard Servlet object, which encapsulates all the data of the HTTP request made by the client. Analogous objects are present in cgi or ASP. The request object contains information on the URL and parameters that were passed in the remote client machine as well as contents of the HTTP header (referring page, what browser is calling, etc.).

Turning next to FIG. 14, data flow diagram illustrating aggressive rerendering is depicted in accordance with a preferred embodiment of the present invention. Rerender daemon 1216 is a thread normally running at low priority. Rerender daemon 1216 will monitor the rerender queue for work to perform. When items are present on the rerender queue for processing, rerender daemon 1216 will increase its priority to normal. Rerender daemon 1216 sends a call to fragment cache 1206 to rerender the fragment (step r1).

Next, in response to the call to fragment cache 1206 to rerender the fragment, fragment cache 1206 sends a request, RequestDispatcher.include( ) to JSP engine 1202 (step r2). In turn, JSP engine 1202 will request the content by sending a service call to JSP 1204 (step r3).

JSP 1204 will accesses a relational database (RDB) 1209 to obtain dynamic content by sending a message to RDB 1209 (step r4). RDB 1209 may be located, for example, at a back end server. A response is returned containing the raw or dynamic content (step r5). JSP 1204 then renders the dynamic content into a HTML format. The resulting HTML content is sent to JSP engine 1202 by JSP 1204 (step r6). In turn, this content is placed into fragment cache 1206 by JSP engine 1202 (step r7). Fragment cache 1206 then calls cache coordinator 1208 to write the fragment for handling by cache coordinator 1208 (step r8). Cache cooriginator 1208 functions to maintain all of the caches in synchronization.

If the fragment has a time limit, cache coordinator 1208 sends an update message to time limit daemon 1210 with the new value to update the expiration time (step r9). A response is returned by time limit daemon 1210 to cache coordinator 1208 (step r10).

If the fragment is for an external cache, then the page is written to an external cache adapter 1212, which results in the HTML content being sent to an external cache (step r11). The fragment may be assigned to a cache group. In such an instance, the fragment is written to each cache in that group. External cache adapter 1212 is a local adapter object that encapsulates the protocol used by the external cache. A response is returned by external cache adapter 1212 to cache coordinator 1208 (step r12). This response indicates whether the write was successful. The response is then sent to fragment cache 1206 (step r13), which in turn is sent to rerender daemon 1216 (step r14).

Figure 15:
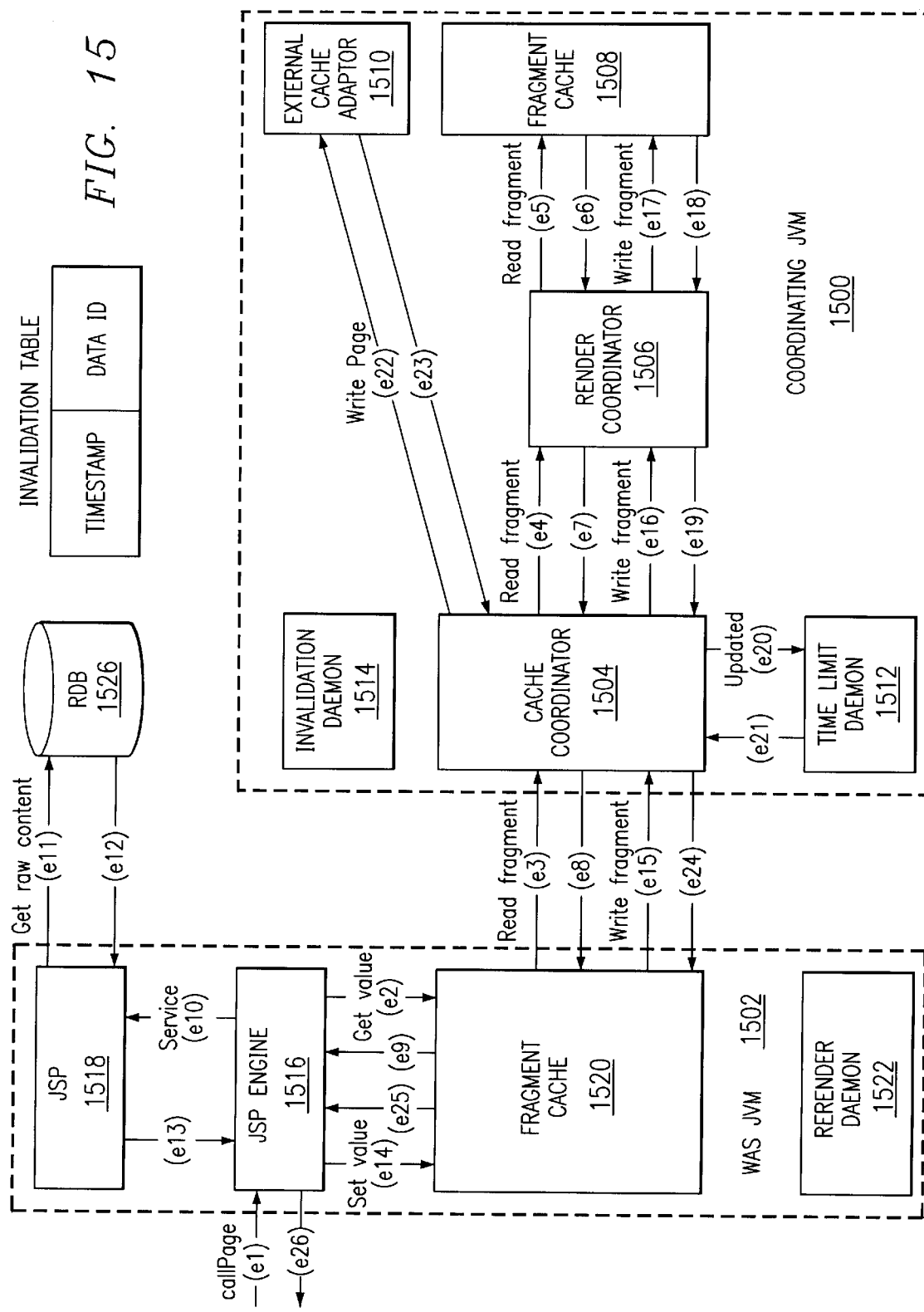
FIG. 15 is a data flow diagram illustrating data flow for handling an external request using multiple JVMs depicted in accordance with a preferred embodiment of the present invention.
Figure 16:
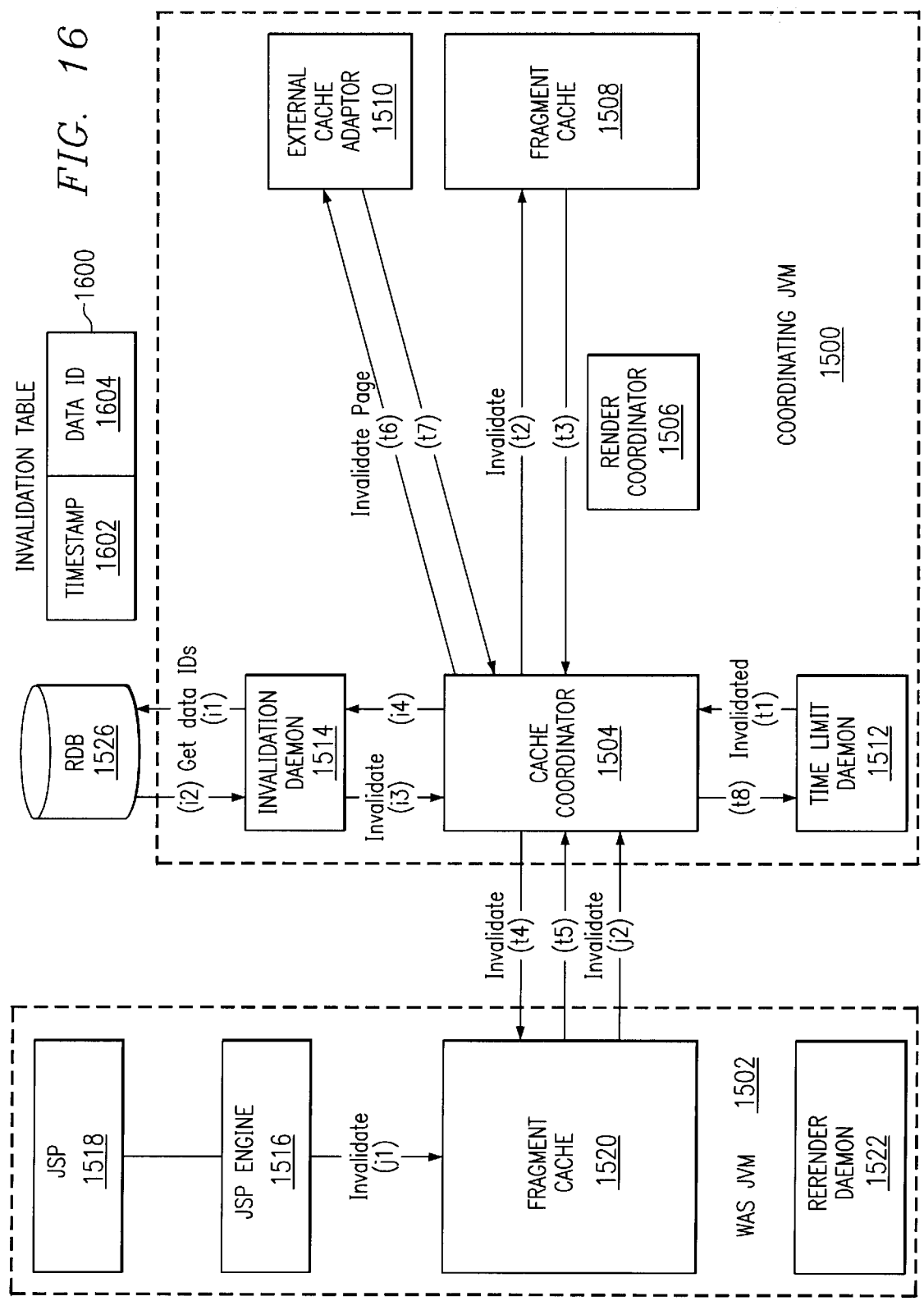
FIG. 16 is a data flow diagram illustrating handling a data ID or fragment ID invalidation, as well as handling time limit expiration for a multi JVM system depicted in accordance with a preferred embodiment of the present invention.
Figure 17:
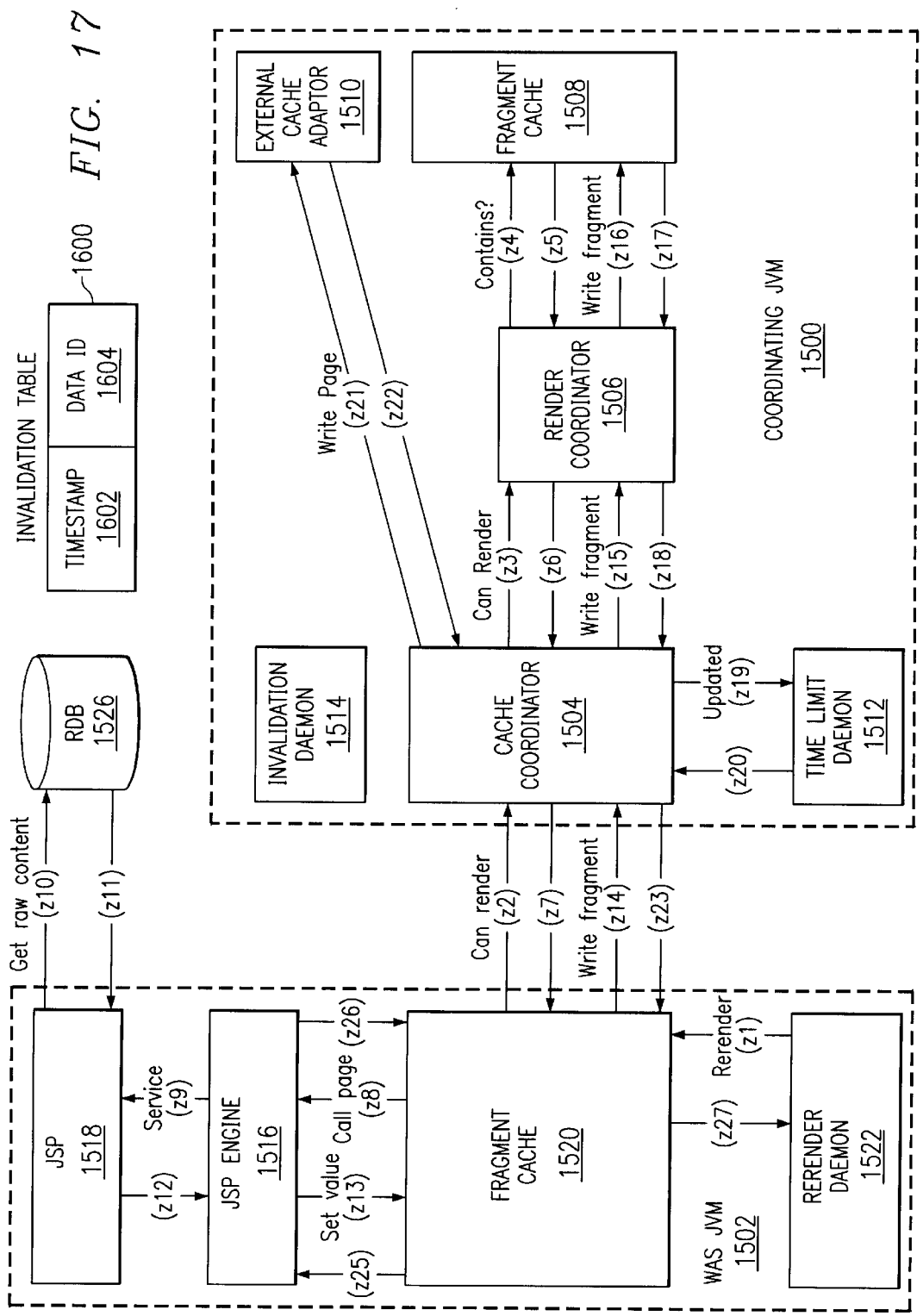
FIG. 17 is a data, flow diagram flow for handling aggressive rerendering using multiple JVMs depicted in accordance with a preferred embodiment of the present invention.

The processes of the present application as described with respect to FIGS. 12–14 are in the context of a single JVM. These processes also may be applied to multiple JVMs located on one or more servers. FIGS. 15–17 illustrate the software structure and data flow for dynamic content caching for web applications when multiple JVMs handle external requests. These JVMs may all be on the same node or can span multiple nodes.

With reference now to FIG. 15, a data flow diagram illustrating data flow for handling an external request using multiple JVMs is depicted in accordance with a preferred embodiment of the present invention. In this example, a coordinating JVM 1500 is present and will interact with Web application server (WAS) JVM 1502. Coordinating JVM 1500 includes a cache coordinator 1504, a render coordinator 1506, a fragment cache 1508, an external cache adapter 1510, a time limit daemon 1512, and an invalidation daemon 1514. WAS JVM 1502 contains a JSP engine 1516, JSP 1518, a fragment cache 1520, and a render daemon 1522. In this example, although a single WAS JVM is shown for purposes of describing data flow, coordinating JVM 1500 may handle multiple WAS JVMs in accordance with a preferred embodiment of the present invention.

The execution of a JSP is triggered by an incoming request for a page received in WAS JVM 1502 by JSP engine 1516 (step e1). This request in the depicted example is a RequestDispatcher.include( ) request in a HTTP format. JSP engine 1516 then sends a get value call to fragment cache 1520 (step e2). In turn, if the fragment needed for the request is not located within the fragment cache 1520, a read fragment call is sent to cache coordinator 1504 within coordinating JVM 1500 (step e3). Cache coordinator 1504 is used as a cache coordinator for all the other JVMs. Cache coordinator 1504 is checked to see if the fragment is present because the fragment may have been rendered by another JVM (not shown) other than WAS JVM 1502.

Cache coordinator 1504 sends the read fragment request to render coordinator 1506 (step e4), which in turn sends the request to fragment cache 1508 in coordinating JVM 1500 (step e5). A response is returned by fragment cache 1508 to render coordinator 1506 (step e6). If the response does not include the fragment, render coordinator 1506 marks the fragment as rendering work-in-progress. A response is then sent back to cache coordinator 1504 (step e7). The response generated by the render coordinator will include either the fragment or an indication that the fragment was absent from cache 1508.

In turn, the response is sent to fragment cache 1520 in WAS JVM 1502 (step e8). If a fragment is present in this response. The client cache will receive a fragment from the second level fragment cache if it is available at that second level. If the fragment is found, then the client cache will put the fragment in its cache. This response is returned to JSP engine 1516 (step e9). If the response indicated that a fragment was absent, then the JSP is executed. The JSP is executed by calling the JSP's service method (step e10). If the fragment was present, the fragment is then returned to the caller requesting the content. More than one fragment might be returned to the caller as a page or in other case, the fragment may make up the entire page.

JSP 1518 accesses relational database (RDB) 1526 to obtain dynamic content by sending a message to RDB 1526 (step e11). A response is returned by RDB 1526 containing the raw or dynamic content (step e12). JSP 1518 then renders the dynamic content into a HTML format. The resulting HTML content is sent to JSP engine 1516 by JSP 1518 (step e13). In turn, this content is placed into fragment cache 1520 by JSP engine 1516 (step e14).

Thereafter, fragment cache 1520 then calls cache coordinator 1504 to write the fragment for handling by cache coordinator 1504 (step e15). The fragment is sent to cache coordinator 1504 to allow other JVMs to access the fragment. Cache coordinator 1504 in turn sends the write fragment request to render coordinator 1506 (step e16), which in turn sends the request to fragment cache 1508 (step e17). A response to the write fragment request is returned to render coordinator 1506 (step e18). If the response indicates that the fragment was successfully written, the fragment is unmarked as a rendering work-in-progress. The response is then passed on to cache coordinator 1504 (step e19).

If the fragment has a time limit, cache coordinator 1504 will send an update message to time limit daemon 1512 with the new value to update the expiration time (step e20). A response is returned by time limit daemon 1512 to cache coordinator 1504 (step e21).

If the fragment is for an external cache, then the page is written to an external cache adapter 1510, which results in the HTML content being sent to an external cache (step e22). The fragment may be assigned to a cache group. In such an instance, the fragment is written to each cache in that group. External cache adapter 1510 is a local adapter object that encapsulates the protocol used by the external cache. A response is returned by external cache adapter 1510 to cache coordinator 1504 (step e23). This response indicates whether the write was successful. The response is then sent to fragment cache 1520 (step e24), which in turn is sent to JSP engine 1516 (step e25). The HTML content is then returned to the party sending the RequestDispatcher.include( ) message (step e26).

Turning now to FIG. 16, a data flow diagram illustrating handling a data ID or fragment ID invalidation, as well as handling time limit expiration for a multi JVM system is depicted in accordance with a preferred embodiment of the present invention. Time limit daemon 1512 wakes periodically to see if any fragments have expired. Time limit daemon 1512 will send an invalidation signal to cache coordinator 1504 (step t1).

Upon receiving notification that a fragment's time limit has expired, cache coordinator 1504 will send a call to the caches to indicate that the fragment is no longer valid. In this example, cache coordinator 1504 sends an invalidate message to fragment cache 1508 (step t2), which results in a response or reply being returned to cache coordinator 1504 (step t3). Cache coordinator 1504 also sends an invalidate message to fragment cache 1520 in JVM 1502 (step t4). A reply as to the results of the request is turned to cache coordinator 1504 from fragment cache 1520 (step t5). In addition, cache coordinator 1504 sends an invalidate page message to external cache adapter 1510 (step t6). A response also is returned by external cache adapter (step t7). These responses indicate the success or failure to invalidate a the fragment. Cache coordinator sends a reply back to time limit daemon 1512 (step t8).

Additionally, a data ID or fragment ID invalidation may be initiated by calling either fragment cache 1520 or cache coordinator 1504. A JSP, such as JSP 1518, has access to its local fragment cache, fragment cache 1520, using a static variable and may send a call through JSP engine 1516 to invalidate a fragment (step j1). The fragment cache 1520 implements this call by forwarding the call to cache coordinator 1504 in JVM 1500 (step j2). At that point, steps t2–t7, as described above, occur to invalidate the fragment.

A database trigger for invalidations is employed in the depicted example. In accordance with a preferred embodiment of the present invention, a database trigger is employed by inserting a record into validation table 1600 in the database in RDB 1526. The record in this example includes a time stamp column 1602 and a data ID column 1604. The time stamp in time stamp column 1602 will indicate when the trigger record was created in invalidation table 1600. The data ID in data ID column 1604 represents the data that has been updated.

As mentioned above with respect to validation in a single JVM, data IDs can refer to whatever granularity is appropriate.

Invalidation daemon 1514 is a thread that runs periodically to perform a cache invalidation algorithm each time it wakes up. Its only state is the latest timestamp it has already processed and the length of its wake interval. Invalidation daemon 1514 reads records from invalidation table 1600 in RDB 1526 (step i1). The records read from invalidation table 1600 are those where the timestamp is greater than the latest timestamp it previously processed. The results are returned to invalidation daemon 1514 (step i2).

Invalidation daemon 1514 sends a notification to cache coordinator 1504 to invalidate any fragments with the specified data ID (step i3). As a result, cache coordination performs steps t2–t7 as described above. A response is sent from cache coordinator 1504 to invalidation daemon 1514 (step i4). In the depicted example, the fragment whose fragment ID was "productDetail—TA23434" would be invalidated.

Further, invalidation daemon 1514 will remember the latest timestamp in the retrieved records. Validation daemon 1514 will sleep for a configured interval before awaking and performing the process again.

Turning now to FIG. 17, a data flow diagram flow for handling aggressive rerendering using multiple JVMs is depicted in accordance with a preferred embodiment of the present invention. When WAS JVM 1502 is idle, rerender daemon 1522 will increase its priority and identify a number of pages or fragments that are present in the rerender key for processing. This identified list of fragments is sent to fragment cache 1520 (step z1). This list includes the fragment IDs along with the identification of WAS JVM 1502 in the depicted example. Fragment cache 1520 forwards this list to cache coordinator 1504 (step z2), which in turn is forward to render coordinator 1506 (step z3). Render coordinator 1506 processes the IDs for the fragments to determine whether a fragment within the list is in a rendering work-in-progress list. The work-in-progress list is maintained by render coordinator 1504 in these examples. Additionally, render coordinator 1506 determines whether the fragment is present in fragment cache 1508 by sending a query to fragment cache 1508 (step z4). The query includes the fragment ID. A response is returned by fragment cache 1508 (step z5).

If the fragment is absent from fragment cache 1508 and is not identified in the render work-in-progress list, render coordinator 1504 returns that fragment ID to the JVM that sent the fragment ID, WAS JVM 1502 for rerendering through cache coordinator 1504 (step z6). The fragment ID for rerendering is sent to fragment cache 1520 from cache coordinator 1504 (step z7).

Next, in response to the fragment ID from cache coordinator 1504, fragment cache 1520 sends a request, RequestDispatcher.include( ) to JSP engine 1516 (step z8). In turn, JSP engine 1516 executes JSP 1518 by calling a service method (step z9). JSP 1518 will access a relational database (RDB) 1526 to obtain dynamic content by sending a message to RDB 1526 (step z10). A response is returned containing the raw or dynamic content (step z11). JSP 1518 then renders the dynamic content into a HTML format. This content becomes the value of the fragment after the servlet/JSP has finished executing. The fragment metadata is currently supplied by the JSP that is executed. The JSP engine provides some information to the fragment to tell it when a page is being inserted and when new request attributes are added. The resulting HTML content is sent to JSP engine 1516 by JSP 1518 (step z12). In turn, this content is placed into fragment cache 1520 by JSP engine 1516 (step z13). Fragment cache 1520 sends the fragment to then call cache coordinator 1504 to write the fragment for handling by cache coordinator 1504 in JVM 1500 (step z14).

The fragment is sent to render coordinator 1506 (step z15), which in turn writes the fragment into fragment cache 1508 (step z16). A response as to the success of this write operation is returned to render coordinator 1506 (step z17). This response is relayed to cache coordinator 1504 (step z18).

If the fragment has a time limit, cache coordinator 1504 sends an update message to time limit daemon 1512 with the new value to update the expiration time (step z19). A response is returned by time limit daemon 1512 to cache coordinator 1504 (step z20).

If the fragment is for an external cache, then the page is written to an external cache adapter 1510, which results in the fragment being sent to an external cache (step z21). The fragment may be assigned to a cache group. In such an instance, the fragment is written to each cache in that group. External cache adapter 1510 is a local adapter object that encapsulates the protocol used by the external cache. A response is returned by external cache adapter 1510 to cache coordinator 1504 (step z22). This response indicates whether the write was successful. The response is then sent to fragment cache 1520 in WAS JVM 1502 (step z23). A response is returned to JSP engine 1516 for the set page call in step z18 (step z25) with a response to call page being returned (step z26). Thereafter a response to the rerender request is sent to rerender daemon 1522 (step z24).

The present invention also incorporates a way to manage failed software components. When the cache coordinator sends a message to the internal or external caches, it uses a timeout when waiting for the reply. If the cache does not respond within the timeout, the cache coordinator assumes the cache is no longer working, so it stops sending messages to the cache and sends a notification to a systems administrator saying that the cache is not functioning.

Thus, a coordinating JVM can significantly improve efficiency in a multi-JVM or multi-node configuration. This efficiency is provided by adding a single coordinating JVM that contains a single cache coordinator, time limit daemon, invalidation daemon, and a render coordinator. Adding a rendering coordinator with its own fragment cache in the coordinating JVM reduces the number of renderings from once per WAS node to once for all WAS nodes. This includes both database access and rendering overhead.

A single invalidation daemon significantly reduces the number of database accessed. In addition, a single invalidation daemon and time limit daemon keeps the WAS JVMs in synch, so that a change shows up across all WAS JVMs at the same time. This avoids users seeing inconsistent results. A single invalidation daemon and time limit daemon reduces the number of messages for invalidations.

Further, having the cache coordinator and time limit daemon in the same JVM reduces messages by piggybacking the notification of a changed fragment value from the WAS JVM to the TimeLimitDaemon on the write fragment message from the WAS JVM to the CacheCoordinator.

With this centralization, the data flows described above in FIGS. 15–17 for a multiple JVM system with a coordinating JVM flows differ from a single JVM system as described in FIGS. 12–14 in the following ways:

When rendered locally, the JSP engine puts it back in the local FragmentCache (steps e14 in FIG. 15 and z16 in FIG. 17). The local FragmentCache sends it to the CacheCoordinator (steps e15 in FIG. 15 and z14 in FIG. 10), so that other caches can use it. For external caches, the cache coordinator behaves as it does in the single JVM case and writes the fragment value aggressively (steps e22 in FIG. 15 and z21 in FIG. 15). For fragment caches, the cache coordinator behaves differently than in the single JVM case and can provide a second-level cache. The cache coordinator can have its own fragment cache, which is used to increase performance as illustrated in FIGS. 15 and 17. Also, the cache coordinator can keep a table of which WAS JVMs, which have rendered which fragments. The cache coordinator can obtain a fragment out of the appropriate WAS JVM when the fragment is requested. The advantage of this approach is reduced memory. This feature is an alternative to keeping the fragments in the coordinating JVM's fragment cache.

Further, when the JSP engine tries to find the fragment in the local fragment cache and the fragment is absent from the local fragment cache, the fragment cache will try to find needed fragment in the cache coordinator (step e3 in FIG. 15) because the fragment may have been rendered by another WAS JVM. If the fragment is not found in either the first or second level fragment cache, the render coordinator will mark the fragment as a work-in-progress and expect the first level cache to send it the fragment upon rendering (step e10 in FIG. 15). A first level fragment cache is the fragment cache that is owned by the local application server process. The second level fragment cache is owned by the render coordinator in the multi-jvm scenario. With a coordinating JVM, only the single CacheCoordinator notifies the time limit daemon that a value has been updated (steps e20 in FIG. 15 and z19 in FIG. 15). This effectively piggybacks this notification on the write fragment message (steps e15 in FIG. 15 and z14 in FIG. 17), taking advantage of the fact that all changes in fragment values goes through this coordinating JVM.

When a WAS JVM is idle, its rerender daemon asks its fragment cache to render the first N pages on the local rerender queue (step z1 in FIG. 17). The fragment cache forwards this via the cache coordinator (step z2 in FIG. 17) to the render coordinator to volunteer for rerendering work (step z3 in FIG. 17). The render coordinator processes these IDs in order, checking to see if the fragment is in the rendering work-in-progress list or in the central fragment cache (step r4 in FIG. 10). If the ID is in neither, it returns that fragment ID for rerendering. The WAS JVM's fragment cache can assume that all IDs prior to the returned ID in the list have already been rerendered, so its local rerenderQueue can be updated accordingly. If an ID was returned, the WAS renders that fragment (step z8 in FIG. 17) and returns it to the RenderCoordinator (steps z14/z15 in FIG. 17) and goes back to sleep.

As described above for the depicted example, the render coordinator assigns a WAS JVM to render a fragment in either of two ways. First, a WAS JVM asks for a fragment and it is not centrally available. This request returns null for the fragment value, indicating that the WAS JVM should render it locally. Second, an idle WAS JVM volunteers to rerender any of a list of fragment IDs and the RenderCoordinator returns one of these ID, indicating that the WAS JVM should render it locally. The render coordinator keeps track of any pending render jobs until they are done, so that the same one is not assigned to more than one WAS JVM. This centralized render coordination scheme does not need to copy across nodes the complex server state required to render or rerender a fragment.

Instead, the scheme always uses a WAS JVM that already has the required server state that is saved from an external request. The render coordinator can use a time out when waiting on a pending render job to be completed, so that a WAS JVM that has died does not cause problems for the rest.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples involved content in the form of HTML pages being requested over the Web using HTTP, the present invention may be used in other environments. For example, the process may be applied to other types of content, such as pages using extensible markup language (XML). Also, the sever processes do not have to reside on JVM's. Although the depicted examples are directed towards a JVM, the mechanism for the present invention may be applied to address spaces in other program language environments. Additionally, although the depicted examples show a particular sequence of writing to an internal cache and an external cache, the sequence of writing to internal and external caches may occur at any order or simultaneously. The embodiment was chosen and described in order to best explain the principles of the invention, the practical application, and to enable others of ordinary skill in the art to understand the invention for various embodiments with various modifications as are suited to the particular use contemplated.

What is claimed is:

1. A web server application for use in a data processing system comprising:
    an engine, wherein the engine receives and responds to requests for a page, wherein the page includes a plurality of fragments, wherein a first portion of the plurality of fragments are stored in an internal cache and a second portion of the plurality of fragments are stored in an external cache group;
    an interface to the external cache, wherein the external cache provides the first portion of the plurality of fragments stored in the external cache group to a client data processing system sending a request for the page; and
    a cache coordinator, wherein the cache coordinator manages fragments located in the internal cache and the external cache, wherein the cache coordinator selectively sends the fragments to the external cache through the interface and wherein information on the fragments is maintained at the data processing system for use in managing the fragments sent to the external cache.

2. The web server application of claim 1, wherein the cache coordinator synchronizes the internal cache and the external cache through controlling invalidation of contents within the internal cache and the external cache.

3. The web server application of claim 1, wherein a plurality of fragments are stored in the internal cache and the external cache.

4. The web server application of claim 3, wherein the cache coordinator stores an identification of the plurality of fragments.

5. The web server application of claim 4, wherein the identification of the plurality of fragments includes a location of the plurality of fragments.

6. The web server application of claim 4, wherein the cache coordinator manages invalidation of the plurality of fragments.

7. The web server application of claim 6, wherein the cache coordinator manages rerendering of a fragment within the plurality of fragments that has been invalidated.

8. The web server application of claim 1, wherein the external cache is located within another data processing system.

9. The web server application of claim 1, wherein the external cache is located within the data processing system.

10. The web server application of claim 1, wherein the external cache includes a first external cache located in a first data processing system and a second external cache located in a second data processing system.

11. The web server application of claim 1, wherein the web server application is executing in a Java virtual machine.

12. The web server of claim 1, wherein the fragments sent to the external cache are selected by the cache coordinator to increase performance.

13. The web server of claim 1, wherein access control is enforced on the internal cache and wherein the fragments sent to the external cache are selected by the cache coordinator as fragments in which access control using authentication is not required for access to the fragments.

14. The web server of claim 1, wherein the cache coordinator sends a message to the external cache to invalidate an expired fragment within the fragments.

15. The web server of claim 1, wherein the fragments sent to the external cache are all of the fragments within the plurality of fragments for the page.

16. The web server of claim 1, wherein the external cache is a plurality of external caches.

* * * * *